United States Patent
vanderZweep et al.

(10) Patent No.: US 9,715,658 B2
(45) Date of Patent: Jul. 25, 2017

(54) METHODS FOR PRODUCING CUSTOMER CONFIGURABLE TECHNICAL MANUALS

(71) Applicant: HONEYWELL INTERNATIONAL INC., Morristown, NJ (US)

(72) Inventors: Jeff vanderZweep, Peoria, AZ (US); Tim Felke, Glendale, AZ (US); Nagabhushana Rao Begur, Glendale, AZ (US); David Mikulka, Zlinsky kraj (CZ); Ronald Bandstra, Allendale, NJ (US); Zdenek Dvorak, Lipuvka (CZ); Dalibor Jurica, Odry (CZ)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 556 days.

(21) Appl. No.: 14/194,058

(22) Filed: Feb. 28, 2014

(65) Prior Publication Data

US 2015/0248611 A1    Sep. 3, 2015

(51) Int. Cl.
*G06N 99/00*    (2010.01)
*G06N 5/04*    (2006.01)
(Continued)

(52) U.S. Cl.
CPC ............. *G06N 5/04* (2013.01); *G06F 11/079* (2013.01); *G06F 11/0766* (2013.01);
(Continued)

(58) Field of Classification Search
CPC .................................................... G06N 99/00
See application file for complete search history.

(56) References Cited

U.S. PATENT DOCUMENTS 5,915,257 A    6/1999    Gartung et al.
6,662,089 B2    12/2003    Felke et al.
(Continued)

FOREIGN PATENT DOCUMENTS

EP    2555114 A1    2/2013
EP    2613212 A1    7/2013

OTHER PUBLICATIONS

Gray J et al: "Data cube: a relational aggregation operator generalizing Group-By, Cross-Tab, and Sub-Totals", Data Engineering, 1996, Proceedings of the Twelfth International Confe Rence N New Orleans, LA, USA Feb. 26-Mar. 1, 1996, Los Alamitos, CA USA, IEEE Comput. Soc, US, Feb. 26, 1996, pp. 152-159, XP010158909, DOI: 10.1109/ICDE.1996.492099 ISBN: 978-0-8186-7240-8.
(Continued)

*Primary Examiner* — Vincent Gonzales
(74) *Attorney, Agent, or Firm* — Lorenz & Kopf, LLP

(57) ABSTRACT

Methods and systems are provided for generating a maintainer troubleshooting tree from the content of a digitally stored fault model of a complex system in real time. The method comprises retrieving all failure modes from a fault model of the complex system for a specific corrective action. The method then receives symptoms from sensors monitoring the complex system in real time and generates a symptom pattern and an associated symptom hash from the received symptoms. The method creates san ambiguity group from the retrieved failure modes. The method further retrieves all repair procedures and test procedures related to the ambiguity group of failure modes, creates a troubleshooting tree for the ambiguity group by ranking each repair procedure and test procedure, and retrieves all technical references encountered while creating the trouble shooting tree. The method then compiles and renders the trouble-
(Continued)

shooting tree and the references into a user perceivable document.

14 Claims, 5 Drawing Sheets

(51) Int. Cl.
| | |
|---|---|
| *G06F 17/30* | (2006.01) |
| *G06F 17/21* | (2006.01) |
| *G06F 17/24* | (2006.01) |
| *G06F 11/07* | (2006.01) |
| *G06Q 10/00* | (2012.01) |
| *G06F 17/22* | (2006.01) |

(52) U.S. Cl.
CPC .......... *G06F 17/211* (2013.01); *G06F 17/248* (2013.01); *G06F 17/30011* (2013.01); *G06N 99/00* (2013.01); *G06Q 10/00* (2013.01); *G06F 17/2229* (2013.01)

(56) References Cited

U.S. PATENT DOCUMENTS

| | | | |
|---|---|---|---|
| 6,748,304 | B2 | 6/2004 | Felke et al. |
| 6,750,864 | B1 | 6/2004 | Anwar |
| 7,260,505 | B2 | 8/2007 | Felke et al. |
| 7,739,292 | B2 | 6/2010 | Falk et al. |
| 7,823,062 | B2 * | 10/2010 | Liberty .............. G06F 17/3089 715/234 |
| 7,990,946 | B2 | 8/2011 | Deguchi |
| 8,019,504 | B2 | 9/2011 | Jamrosz et al. |
| 8,239,778 | B2 | 8/2012 | Sheth-Voss et al. |
| 8,264,949 | B2 | 9/2012 | Ravindran et al. |
| 8,378,853 | B2 | 2/2013 | Smith et al. |
| 8,526,311 | B2 | 9/2013 | Ballard et al. |
| 8,527,328 | B2 | 9/2013 | Grace et al. |
| 8,824,337 | B1 | 9/2014 | Geisberger |
| 8,854,953 | B2 | 10/2014 | Enyedi et al. |
| 8,913,797 | B1 | 12/2014 | Siddavanahalli |
| 2002/0124211 | A1 | 9/2002 | Gray et al. |
| 2005/0021531 | A1 | 1/2005 | Wen et al. |
| 2005/0223288 | A1 | 10/2005 | Berbaum et al. |
| 2008/0091707 | A1 | 4/2008 | Brown et al. |
| 2008/0228745 | A1 | 9/2008 | Markus et al. |
| 2008/0288525 | A1 | 11/2008 | Leikucs et al. |
| 2009/0027392 | A1 | 1/2009 | Jadhav et al. |
| 2010/0153832 | A1 | 6/2010 | Markus et al. |
| 2011/0078188 | A1 | 3/2011 | Li et al. |
| 2012/0232743 | A1 * | 9/2012 | Singh .................... G06Q 10/20 701/29.9 |
| 2012/0232905 | A1 | 9/2012 | Rajpathak et al. |
| 2012/0303662 | A1 | 11/2012 | Tewari et al. |
| 2012/0317149 | A1 | 12/2012 | Jagota et al. |
| 2013/0225200 | A1 | 8/2013 | Ben Hamida et al. |
| 2013/0246439 | A1 | 9/2013 | Liekens et al. |
| 2013/0254213 | A1 | 9/2013 | Cheng et al. |
| 2014/0129551 | A1 | 5/2014 | Markus et al. |
| 2014/0214855 | A1 * | 7/2014 | Attaluri ............. G06F 17/30339 707/747 |
| 2014/0279189 | A1 | 9/2014 | Kubicki et al. |
| 2014/0331156 | A1 | 11/2014 | Kulikov |
| 2014/0337306 | A1 | 11/2014 | Gramatica |

OTHER PUBLICATIONS

EP Extended Search Report for Application No. EP 14172777.6 dated Dec. 18, 2014.
Extended EP Search Report for EP 15155261.9-1958 dated Feb. 6, 2015.
USPTO Office Action, Notification Date Dec. 18, 2015; U.S. Appl. No. 14/231,472.
USPTO Office Action, Notification Date Feb. 1, 2016; U.S. Appl. No. 13/930,061.
Premerlani, William J., and Michael R. Blaha. "An approach for reverse engineering of relational database." Reverse Engineering, 1993., Proceedings of Working Conference on. IEEE, 1993.
Data, C. J. An introduction to database systems. Addison-Wesley publ., 1975.
USPTO Office Action for U.S. Appl. No. 14/231,472; Notification date Jun. 2, 2016.
USPTO Final Office Action for U.S. Appl. No. 13/930,061 dated Jul. 26, 2016.
EP Examination Report for Application No. 15159300.1-1952 dated Jul. 14, 2016.
USPTO Office Action for U.S. Appl. No. 14/231,472 dated Dec. 16, 2016.
EP Examination Report for Application No. 15155261.9-1953 dated Feb. 15, 2017.
Department of Defense, et al, "MIL-STD-1309D: Definitions of Terms for Testing, Measurement and Diagnostics"; Feb. 12, 1992, XP055343631, URL:http://www.product-lifecycle-management.com/download/MIL-STD-1309D.pdf (retrieved on Feb. 8, 2017).
USPTO Office Action for U.S. Appl. No. 13/930,061 dated Feb. 27, 2017.
New book: Microsoft Excel 2010 Formulas & Functions Inside out/Dec. 23, 2011/Retrieved Feb. 21, 2017 [https://blogs.msdn.microsoft.com/microsoft_press/2011/12/232/new-book-microsoft-excel-2010-formulas-functions-inside-out].

* cited by examiner

METHODS FOR PRODUCING CUSTOMER CONFIGURABLE TECHNICAL MANUALS

TECHNICAL FIELD

The present invention generally relates to the creation of technical manuals. More particularly the present invention relates to the use of fault model content to produce tailored or customized technical manuals on demand.

BACKGROUND

Generation and maintenance of technical manuals has been a very difficult and expensive task in the past and will become more expensive as system complexity continues to increase. Technical manuals have been created manually by a group of experienced people with deep knowledge of a system. For complex systems like higher-level electronic controllers, engine or whole vehicle, the process of compilation of technical manual will take a long time and the result will be a manual that does not fully utilize the observable symptoms to optimize troubleshooting. After a manual is created, it has to be reviewed to remove as many discrepancies as possible and ensure that all possible failures are covered and that for each failure all necessary tests and maintenance procedures are included. Much of this work has to be repeated for each update of the design of the system.

The entire process is error prone because of human mistakes since the whole work is done manually. The technical manuals are mainly stored as PDF, MS Word, MS Excel and textual artifacts, so the content is not easily integrated to a level of fidelity to support automated inference. The manual creation of technical documentation is time consuming, expensive, difficult to maintain, and requires a deep system knowledge.

Accordingly, it is desirable to develop a method to quickly, accurately and cheaply create technical manuals for complex systems. Furthermore, other desirable features and characteristics of the present invention will become apparent from the subsequent detailed description of the invention and the appended claims, taken in conjunction with the accompanying drawings and this background of the invention.

BRIEF SUMMARY

A method is provided for automatically generating a maintainer useable troubleshooting tree from the content of a digitally stored fault model of a complex system in real time. The method comprises retrieving all failure modes from a fault model of the complex system by a processor for a specific corrective action. The method then receives symptoms from sensors monitoring the complex system in real time, generates a symptom pattern and an associated symptom hash from the received symptoms, and for the symptom pattern, creates an ambiguity group from the retrieved failure modes. The method further retrieves all repair procedures and test procedures related to the ambiguity group of failure modes from the fault model, creates a troubleshooting tree for the ambiguity group by ranking each repair procedure and test procedure, and retrieves all technical references encountered while creating the trouble shooting tree. The method then compiles and renders the troubleshooting tree and the references into a user perceivable document based on a standard technical manual skeleton data structure configured to record the trouble shooting tree and the references.

A system is provided for automatically generating a maintainer useable troubleshooting tree from the content of a digitally stored fault model of a complex system in real time. The system comprises a processor, a plurality of sensors configured to monitor the complex system and to supply symptom data in real time to the processor. The system further comprises a memory device containing the digitally stored fault model of the complex system in communication with the processor, and an output device configured to render the maintainer useable trouble shooting tree.

A tangible, non-transitory computer readable medium is provided. The computer readable medium contains instructions that when executed perform the steps of retrieving all failure modes associated with the corrective action from a fault model of the complex system by a processor and receiving symptoms from sensors monitoring the complex system in real time. The steps then generate a symptom pattern and an associated symptom hash from the received symptoms. For the symptom pattern the steps create an ambiguity group from the failure modes, retrieve all repair procedures and test procedures related to the ambiguity group from the fault model, and create a troubleshooting tree for the ambiguity group by ranking each repair procedure and test procedure. When the tree is complete, the steps further include retrieving all technical references encountered while creating the trouble shooting tree, and compiling and rendering the troubleshooting tree and the references into a user perceivable document based on a standard technical manual skeleton data structure configured to record the trouble shooting tree and the references.

Furthermore, other desirable features and characteristics will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

Figure 1:
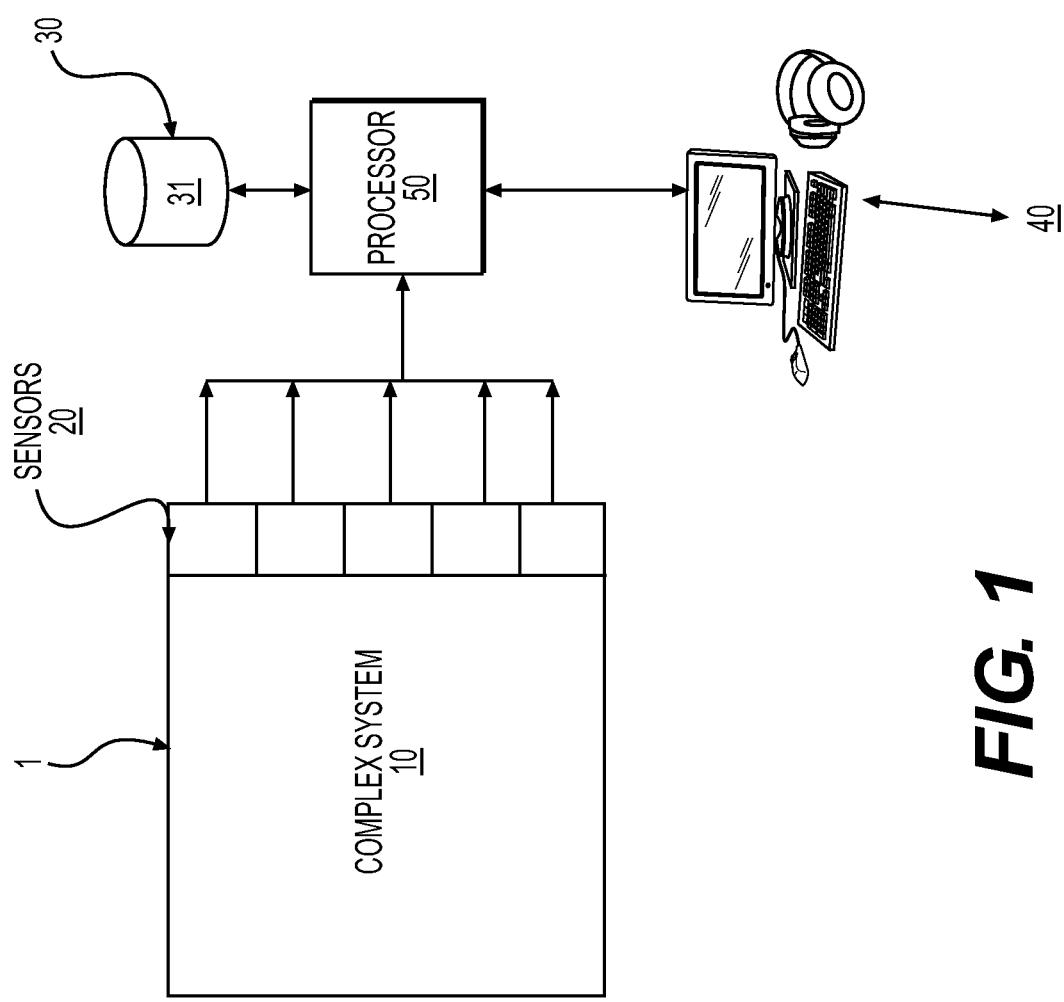
FIG. 1 is a simplified system diagram of an exemplary system for generating technical manuals from a default model.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The word "exemplary" is used exclusively herein to mean "serving as an example, instance, or illustration." Any embodiment described herein as "exemplary" is not necessarily to be construed as preferred or advantageous over other embodiments.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal In the alternative, the processor and the storage medium may reside as discrete components in a user terminal In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal In the alternative, the processor and the storage medium may reside as discrete components in a user terminal In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

As used herein, a "fault" refers to the observable defect or imperfection in a system. The key issue is that a fault is an actual, physical defect in a real, material system. As an example, an inoperative light bulb in a specific location on a specific aircraft at a specific time is a "fault" or a "failure." Fault and failure are synonymous.

Contrarily, the phrase "failure mode" refers to the manner by which a failure or fault is observed in terms of the "symptoms" it generates, the functions it affects, its ultimate cause and the corrective actions required to remove the cause. A "failure mode" is a conceptual entity used to describe a class of "faults" that could occur in the system. A failure mode concept allows analysts to reason about hypothetical fault occurrences and to propose design improvements to reduce their impact and to develop maintenance practices to reduce their occurrence rates and/or ensure their effective remedy. As illustrative examples: "light bulb that fails to illuminate due to internal failure" and "light bulb fails to illuminate due to lack of power" are both examples of "failure modes." Neither of these refers to a specific physical light bulb. Rather, they describe a class of faults/failures that could occur. Hence, a "failure mode" and a "fault" are two distinctly different but related concepts.

A "symptom" as used herein is the identifiable physical manifestation of a "fault." As an illustrative example, a symptom of an open circuit can be an extinguished light bulb in the circuit. Likewise, and extinguished light bulb is also a symptom of a defective light bulb. Thus, a symptom may be partially indicative evidence of several different faults, which in turn may be indicative of several different failure modes. A symptom can be a test outcome or an observation, such as an extinguished lamp.

A "symptom pattern" as used herein is a hash value which uniquely represents a set of symptoms for a given failure mode. A symptom pattern is evidence used to determine an ambiguity group of failure modes associated with faults that have the same trouble shooting tree. A single symptom pattern may be indicative of multiple failure modes.

"Hash values" are the values returned by a hash function. A "hash function" is any algorithm that maps data of variable length to data of a fixed length. Hash functions are well known in the art and will not be discussed further herein in the interest of simplicity and brevity. Any suitable hash function may suffice to produce the hash values referred to herein. The selected Hash Function converts a longer text expression into a 32 bit integer with absolute determinism, meaning that for a given input value it must always generate the same hash value, and a very high degree of uniformity, meaning that it should map the expected inputs as evenly as possible over its output range.

An "ambiguity group" as used herein is a set of "failure modes," where each member of the set is a failure mode that is associated with a "fault" that may possibly, but not necessarily cause a particular symptom to manifest. Any particular failure mode in an ambiguity group can but may, or may not, be causing the fault. Thus, the term "ambiguity."

A "technical manual skeleton" (or, tech manual skeleton) is a data structure used to capture, collect and arrange data constituting the content of an end user technical manual product. A tech manual skeleton includes data including but not limited to system parts/assemblies, repair procedures, reference documents, test procedures and related outcomes and symptom patterns.

A "trouble shooting tree" is a complex sequence of maintenance activities that is used to guide a maintainer in trouble shooting one or more manifested symptoms. A trouble shooting tree includes sets of system tests and corrective actions to be executed by in a specified order on a complex system. A "Corrective Action" is a specific action that clears a fault. A non-limiting example of a corrective action is to change out an engine. A "repair procedure" is a list of steps required in order to carry out the corrective action. For example—to change an engine, one must perform steps 1 to 10.

FIG. 1 is a simplified system diagram of a system 1 supporting the subject matter disclosed herein. System 1 comprises a complex system 10 being monitored by one or more sensors 20. The complex system may be any complex system. Non-limiting examples include a vehicle, a production plant and a transmission system. Sensors 20 may be any sensor known in the art or that may be developed in the future. Sensors 20 generally comprise hardware devices that can detect physical phenomena as occurring within the various subcomponents of the complex system that are typically un-detectible by humans without the use of hardware devices. In other words, detection of such phenomena typically cannot be done by humans. Hence, the methods disclosed herein are inextricably tied to the complex system and to the sensor devices incorporated therein.

Output signals representing physical phenomena occurring within the complex system 10 detected by the sensors 20 are received by processor 50, which in communication with a data storage device 30 containing a fault model 31 of the complex system 10. A fault model 31 is a digitized computer model of the structure and operation of the complex system 10 and contains information about the complex system including but not limited to failure modes, corrective actions, repair procedures, fault conditions, and uniquely identified symptoms associated with fault conditions and failure modes. Processor 50 is also in communication with output device 40 which may be any computer output device known in the art such as a display screen or a printer.

Figure 2:
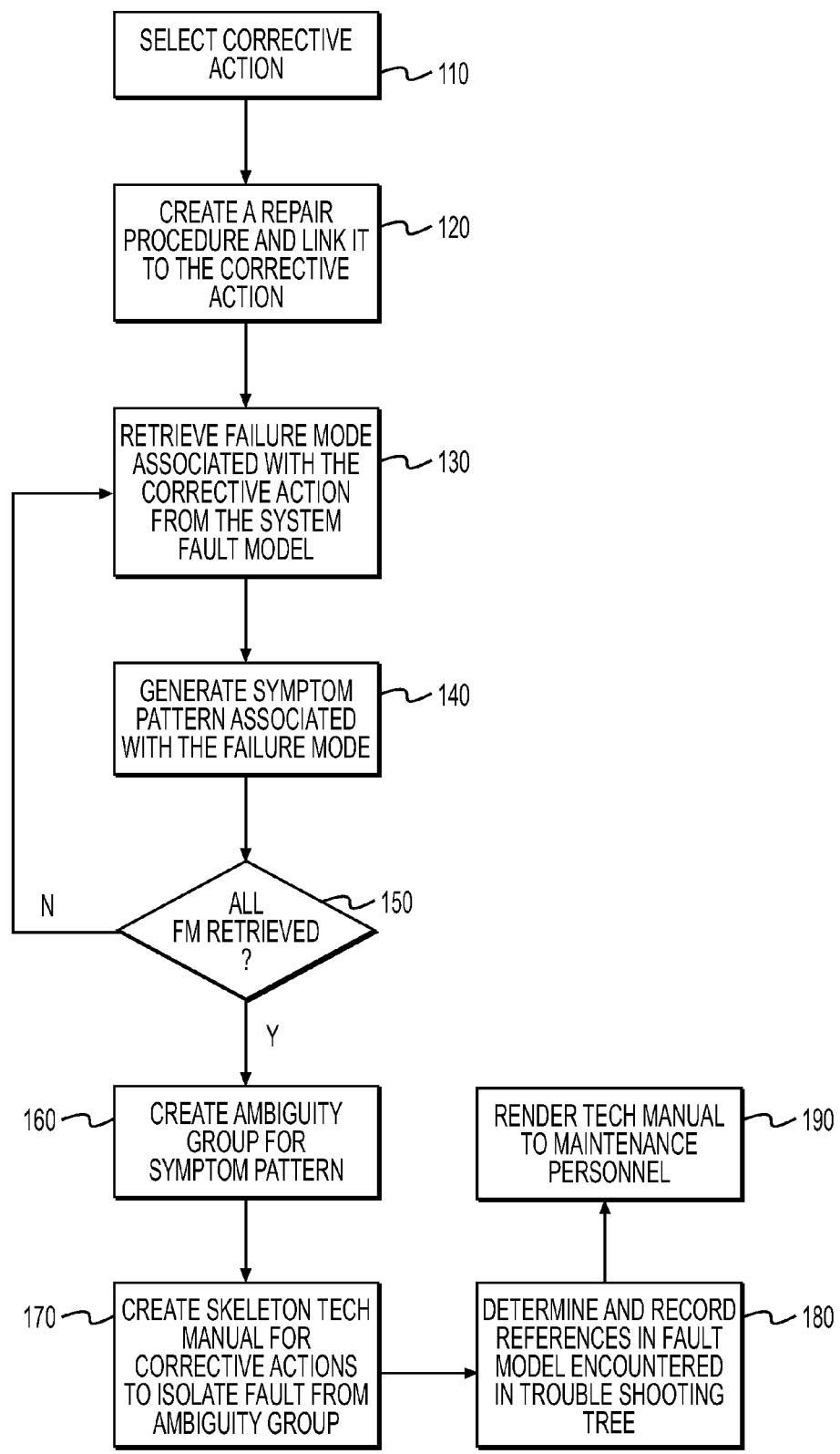
FIG. 2 is a simplified flow diagram of an exemplary method for generating technical manuals from a default model.

FIG. 2. is a simplified flow diagram of the method(s) 100 disclosed herein. Method 100 is simplified in that it produces a technical manual in real time based on the identification of a single corrective action to be performed. Those of ordinary skill in the art will recognize that method 100 may be used in an iterative fashion to produce multiple technical manuals for multiple corrective actions or used as a subroutine to produce a single technical manual to address multiple corrective actions either related or unrelated to each other. Such complexities are manifold and will not be discussed herein in detail in the interest of clarity and brevity.

At process 110, a corrective action to be executed is selected or identified by either maintenance personal, or by a processor executing instructions to do so under some rubric. At process 120, a repair procedure by which to execute the corrective action is created and logically linked to the corrective action. An engine change out is used herein as a corrective action by way of example, but the use of this example is not to be so limiting.

The repair procedure is created by processor 50 using other, extraneous subroutines the coding of which is known in the art or that may readily be devised. The processor 50 searches the fault model for the procedures, assemblies, parts, supplies of the engine to be changed which are contained in the files of the fault model 31 or other associated databases.

At process 130, a failure mode that is logically associated with the corrective action is retrieved from the fault model 31. At process 140, a Symptom Pattern that is associated with the failure mode is generated (See FIG. 3). Symptom patterns may be generated in an iterative fashion at decision point 150, one for each failure mode, until it is determined that all failure modes have been assigned a Symptom Pattern.

At process 160, an ambiguity group is created for each Symptom Pattern generated. Thus, each failure mode in the ambiguity group can, but may or may not, be indicted by the set of symptoms being manifested by the complex system 10.

At process 170, a skeleton technical manual is created for each ambiguity group. The skeleton technical manual is essentially a standardized data structure into which data from the default model may be arranged to create a troubleshooting tree. A "trouble shooting tree" is a complex sequence of activities (e.g., tests and other corrective actions in a defined sequence) which when followed guides a maintainer to disambiguate a failure mode from the ambiguity group as the actual cause of a fault. The trouble shooting tree is created by first providing a corrective action input, or starting point. The sub-routines underlying process 170 then logically "follow" the interrelated data structures (with data items) leading from the input within the fault model 31 and copies the data to the skeleton technical manual. The fault model 31 itself does not have to be designed to support process 170 but the functionality is added on top of the existing fault model to build an output trouble shooting tree based on the connected data in the fault model 31

Figure 3:
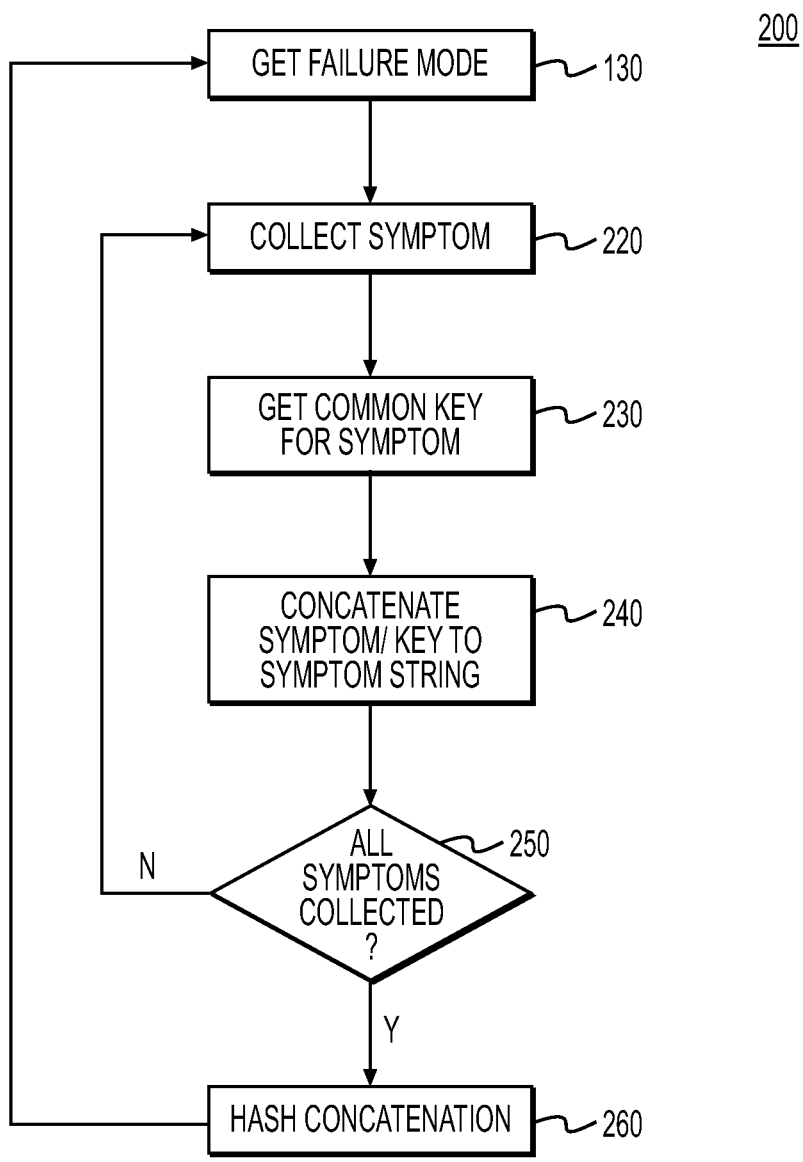
FIG. 3 is a flow chart of an exemplary process for creating a failure mode hash value.

FIG. 3 is a flow chart of process 140 creating a failure mode hash value. At process 130 a failure mode is received or inputted. At process 220, one or more symptoms are collected from the sensors 20.

It must be understood that in complex systems symptoms are generally determined from signals sent from sensors 20 monitoring the complex system 10 for physical parameters. Thus, the signals representing symptoms that are being received from sensors 20 cannot be produced by humans without specific apparatus to do so. Like x-ray data of a bone being processed by an x-ray machine, these symptom signals are indeed tied to the complex system, components or physical processes thereof.

At process 230, a unique key associated with the particular symptom is retrieved by the processor 50 from the fault model 31 or associated databases. The unique key is concatenated to a string of keys for other symptoms collected for the same failure mode at process 240. Herein, this concatenation will be referred to as a "Symptom String." The common keys in the Symptom String may be separated by a delimiter if necessary or desired. A delimiter can be any character or character string. As a non-limiting example a delimiter may be a semi-colon (;).

When it is determined at decision point 250 that all symptoms associated with the failure mode have been collected into the Symptom String (e.g., using a checklist or data table), the Symptom String is hashed such that a single hash value is created, after which the next failure mode is obtained at process 130 in an iterative fashion.

When all failure modes have been hashed, there then exists a set of unique hash values-symptom string pairs. Each of the hash and the string identify all of the symptoms of a specific failure mode. To the extent that two failure modes have hash value/symptom string pairs that are identical, which is referred to herein to a "hash collision," one or the other may be recomputed using a different, or an additional, delimiter.

Figure 4:
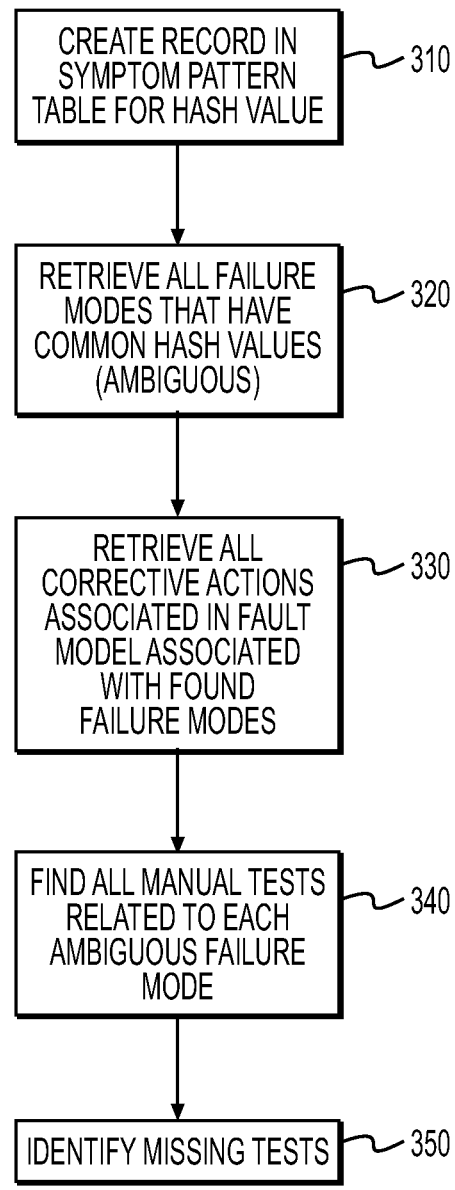
FIG. 4 is a logic flow diagram of an exemplary process for crating an ambiguity group for a particular failure mode.

FIG. 4 is a logic flow diagram of process 160 that creates an ambiguity group for a particular failure mode in what will be referred to herein as a Symptom Pattern Table. A Symptom Pattern Table is created for the hash value at process 320. At process 330, the processor 50 locates all of the Failure Modes with equal hash values, which means the same set of sensor indications implies any of these Failure Modes as the cause of the fault. If no two failure modes have the same hash value then an ambiguity indicator flag is set to "no ambiguity," hence, the failure mode causing the failure is known and there is no ambiguity group since the cause of the failure is now known. If two or more Failure Modes have the same hash value, then the ambiguity indicator flag is set to "ambiguity."

At process 330, the processor 50 retrieves all Corrective Actions that are associated with the located Failure Modes of the ambiguity group from the fault model 31. A logical relationship(s) is created by the processor 50 between the Failure Mode(s) and the Corrective Action(s) retrieved from the fault model 31.

At process 340, for each ambiguous Failure Mode the processor 50 locates associated test procedures from the fault model 31, including any standard tests that may not be directly linked to the Failure Mode (See, 350). The test procedures are manually executed test procedures.

At process 170, the skeleton tech manual is created and populated with the corrective actions, tests, failure modes (including information concerning historical likelihoods of failure modes occurring). As part of the data included in the skeleton tech manual a troubleshooting tree of corrective actions for the Failure Mode is created. Trouble shooting trees, per se, are well known in the art (See, e.g., *Troubleshooting Trees|The ART of Trouble Shooting*, found at http://artoftrouble shooting.com/2013/02/26/troubleshooting trees). However, herein, known database searching and scrapping techniques are utilized to automatically locate the failure modes from the fault model 31 related to the corrective action, the failure mode historical likelihoods, cost for a repair action/test, and expected time to complete the repair action/test. Thus, tests and repair actions are ranked by recursive iteration upon receiving repair/test feedback. As the iteration process proceeds, particular faults are proved or disproved and different "branches" traversed in response thereto. Exemplary non-limiting examples of nodes may include:

A) If test 1 fails, the fault could be fault 1, fault 2 or fault 3.

B) If test 2 passes, the fault is not fault 5.

A "branch" of a troubleshooting tree is a node in the tree where action/decision is identified and repair/test feedback is expected the receipt of which disambiguates a failure mode from the ambiguity group.

Figure 5:
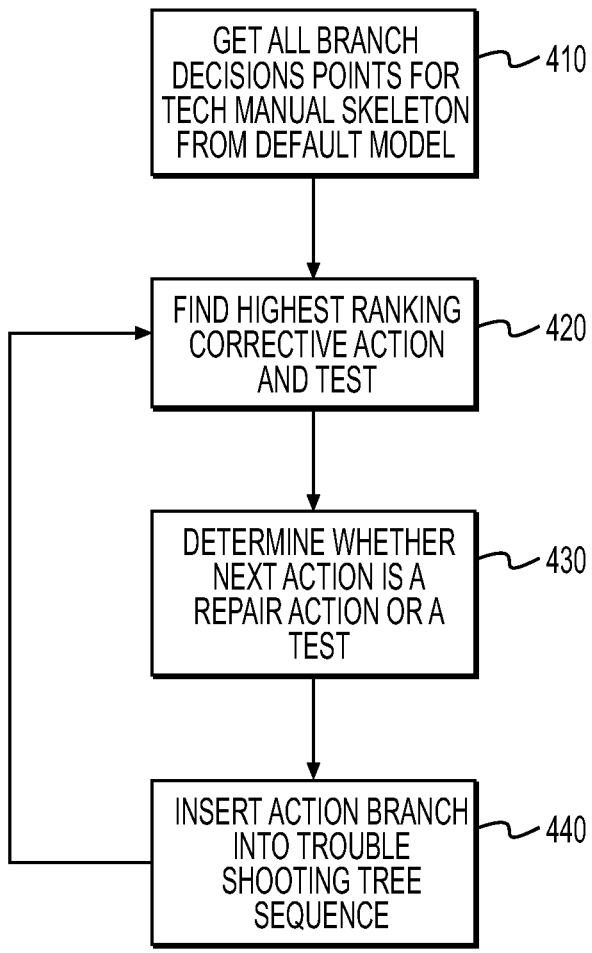
FIG. 5 is a simplified, exemplary flow chart of a process for automatically constructing a troubleshooting tree for a particular technical manual skeleton.

FIG. 5 is a simplified, exemplary flow chart for automatically constructing a troubleshooting tree for a particular technical manual skeleton. At process 410, all of the branch decision points are retrieved from the fault model 31. These may include all of the repair actions and tests for all of the corrective action regarding a failure mode technical manual.

At process 420, the highest ranking repair action or test is determined Factors used to rank repair procedures and tests include historical likelihood as the cause/solution to a fault, cost to implement and time to complete.

At Process 430, the process 170 determines whether the next action is a test or a repair action. At process 440 the determined repair action or test is added to the trouble shooting tree.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for automatically generating a maintainer useable troubleshooting tree from content of a digitally stored fault model of a complex system in real time, the method comprising:

for a specific corrective action, retrieve, by a processor, failure modes associated with the corrective action from a fault model of the complex system;

receive, by a processor, symptoms in real time from sensors monitoring the complex system;

generate, by a processor, a symptom pattern and an associated symptom hash from the received symptoms;

for the symptom pattern, create, by a processor, an ambiguity group of failure modes from the retrieved failure modes;

retrieve, by a processor, repair procedures and test procedures related to the ambiguity group of failure modes from the fault model;

create, by a processor, a troubleshooting tree for the ambiguity group of failure modes by ranking each repair procedure and test procedure;

retrieve, by a processor, technical references encountered while creating the trouble shooting tree; and compile and render, by a processor, the troubleshooting tree and the references into a user perceivable document based on a standard technical manual skeleton data structure configured to record the trouble shooting tree and the references, wherein when a first hash value and a first symptom pattern of a first failure mode are both identical to a second symptom pattern and a second hash value of a second failure mode, the method further comprises changing a delimiting character of one of the first and second symptom patterns.

2. The method of claim 1, wherein the symptom pattern is a concatenation of unique keys, and each unique key uniquely identifies a symptom.

3. The method of claim 2, wherein each unique key is separated by a delimiting character.

4. The method of claim 3, wherein a hash value of the symptom hash is derived from the symptom pattern by applying a hash function to the delimited symptom pattern.

5. The method of claim 1, wherein the ambiguity group of failure modes is determined by:

retrieving all failure modes with the same hash value;

when no two failure modes have the same hash value, setting an ambiguity indicator flag to "no ambiguity";

when two or more failure modes have the same hash value, setting the ambiguity indicator flag to "ambiguity".

6. The method of claim 5, further comprising retrieving Corrective Actions from the fault model and creating a logical relationship between the Corrective Actions and the failure mode(s) associated with Corrective Actions as established in the fault model.

7. A system for automatically generating a maintainer useable trouble shooting tree from content of a digitally stored fault model of a complex system in real time comprising:

a processor;

a plurality of sensors configured to monitor the complex system and to supply symptom data in real time to the processor;

a memory device containing the digitally stored fault model of the complex system in communication with the processor; and an output device configured to render the maintainer useable trouble shooting tree, wherein the processor is configured to generate a symptom pattern and an associated symptom hash from the received symptom data, and when a hash symptom and the symptom pattern of a first failure mode are both identical to a symptom pattern and a hash symptom of a second failure mode, the processor is further configured to change a delimiting character of the symptom pattern of one of the first or the second failure modes.

8. The system of claim 7, wherein the processor is configured to create a symptom pattern comprising a concatenation of unique keys, each unique key uniquely identifying a symptom identified by one of the plurality of sensors.

9. The system of claim 8, wherein each unique key is separated by a delimiting character.

10. The system of claim 9, wherein a hash value of the symptom hash is derived from the symptom pattern by applying a hash function to the delimited symptom pattern.

11. A tangible, non-transitory computer readable medium containing instructions that when executed perform the steps of:
- retrieving all failure modes associated with a corrective action from a fault model of a complex system by a processor;
- receiving symptoms from sensors monitoring the complex system in real time;
- generating a symptom pattern and an associated symptom hash from the received symptoms;
- for the symptom pattern, create an ambiguity group from the failure modes;
- retrieving all repair procedures and test procedures related to the ambiguity group from the fault model;
- creating a troubleshooting tree for the ambiguity group by ranking each repair procedure and test procedure;
- retrieving all technical references encountered while creating the trouble shooting tree; and
- compiling and rendering the troubleshooting tree and the references into a user perceivable document based on a standard technical manual skeleton data structure configured to record the trouble shooting tree and the references, wherein when a symptom hash and a symptom pattern of a first failure mode are both identical to a symptom pattern and a symptom hash of a second failure mode, then changing a delimiting character of the symptom pattern of one of the first or the second failure modes.

12. The computer readable medium of claim 11, wherein the processor is configured to create a symptom pattern comprising a concatenation of unique keys, each unique key uniquely identifying a symptom identified by one of the plurality of sensors.

13. The computer readable medium of claim 12, wherein each unique key is separated by a delimiting character.

14. The computer readable medium of claim 13, wherein a hash value of the symptom hash is derived from the symptom pattern by applying a hash function to the delimited symptom pattern.

* * * * *